(12) United States Patent
Nagane et al.

(10) Patent No.: US 10,401,211 B2
(45) Date of Patent: Sep. 3, 2019

(54) ELECTRONIC BALANCE

(71) Applicant: A&D COMPANY, LIMITED, Tokyo (JP)

(72) Inventors: Yoshikazu Nagane, Saitama (JP); Norihiko Kumagai, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 225 days.

(21) Appl. No.: 15/557,712

(22) PCT Filed: Mar. 27, 2015

(86) PCT No.: PCT/JP2015/059560
§ 371 (c)(1),
(2) Date: Sep. 12, 2017

(87) PCT Pub. No.: WO2016/157280
PCT Pub. Date: Oct. 6, 2016

(65) Prior Publication Data
US 2018/0058908 A1 Mar. 1, 2018

(51) Int. Cl.
*G01G 7/04* (2006.01)
*G01G 23/01* (2006.01)
(Continued)

(52) U.S. Cl.
CPC ............. *G01G 7/02* (2013.01); *G01G 7/04* (2013.01); *G01G 21/24* (2013.01); *G01G 23/01* (2013.01); *G01G 23/012* (2013.01)

(58) Field of Classification Search
CPC .. G01G 7/02; G01G 7/04; G01G 7/06; G01G 21/24; G01G 23/01; G01G 23/012
See application file for complete search history.

(56) References Cited

U.S. PATENT DOCUMENTS 4,300,647 A * 11/1981 Knothe ................ G01G 19/414
177/210 EM
4,494,620 A * 1/1985 Knothe ................ G01G 23/002
177/212
(Continued)

FOREIGN PATENT DOCUMENTS

JP 62-193528 A 12/1987
JP 04-268419 A 9/1992
(Continued)

OTHER PUBLICATIONS

International Search Report and Written Opinion dated May 19, 2015 in the corresponding application PCT/JP2015/059560.

*Primary Examiner* — Randy W Gibson
(74) *Attorney, Agent, or Firm* — Roberts Mlotkowski Safran Cole & Calderon, P.C.

(57) ABSTRACT

Provided is an electronic balance of electromagnetic force type including a weight automatic loading mechanism which can place and remove a weight by its own mechanism without use of either an external balance weight or a built-in balance weight. An electronic balance of electromagnetic force type is provided with a beam equilibrium setting unit that sets two or more equilibrium states of the beam position detecting unit. By making conversion ratios of upper and lower light receiving circuits nonequivalent, an imaginary weight is generated by utilizing the operating principle of the electromagnetic balance of electromagnetic force type.

6 Claims, 10 Drawing Sheets

(51) Int. Cl.
    *G01G 7/02*    (2006.01)
    *G01G 21/24*   (2006.01)

(56) References Cited

U.S. PATENT DOCUMENTS

| | | | | |
|---|---|---|---|---|
| 4,964,478 | A * | 10/1990 | Stadler | G01G 21/244 |
| | | | | 177/229 |
| 5,493,078 | A * | 2/1996 | Uchiike | G01G 7/04 |
| | | | | 177/210 EM |
| 7,964,806 | B2 * | 6/2011 | Freydank | G01G 23/10 |
| | | | | 177/185 |
| 9,116,031 | B2 * | 8/2015 | Beguin | G01G 7/04 |
| 2005/0205309 | A1 * | 9/2005 | Iiduka | G01G 7/04 |
| | | | | 177/185 |
| 2013/0220711 | A1 * | 8/2013 | Beguin | G01G 7/04 |
| | | | | 177/210 EM |

FOREIGN PATENT DOCUMENTS

| | | |
|---|---|---|
| JP | 05-281014 A | 10/1993 |
| JP | 2001-013001 A | 1/2001 |
| JP | 2010-139315 A | 6/2010 |
| JP | 2012-154878 A | 8/2012 |

\* cited by examiner

Fig. 7

| | Ratios of upper and lower light receiving units (upper : lower) | An | Imaginary weight | Repetition performance (standard deviation σ) |
|---|---|---|---|---|
| Standard state | 100kΩ : 100kΩ (50:50) | 1.00 | — | — |
| State A | 91kΩ : 100kΩ (48:52) | 0.92 | 1.7g | ◎ |
| State B | 85kΩ : 100kΩ (46:54) | 0.85 | 3.3g | ◎ |
| State C | 39kΩ : 100kΩ (29:71) | 0.41 | 19g | ○ |
| State D | 8kΩ : 100kΩ (7:93) | 0.08 | 63g | △ |

ELECTRONIC BALANCE

CROSS-REFERENCE TO RELATED APPLICATIONS

The present application is a U.S. National Phase of PCT/JP2015/059560 filed on Mar. 27, 2015. The disclosure of the PCT Application is hereby incorporated by reference into the present Application.

TECHNICAL FIELD

The present invention relates to an electronic balance of electromagnetic force type.

BACKGROUND ART

In order to check the performance of a balance, generally, repetition performance thereof is measured by placing a balance weight from the outside and removing it from a weighing pan. In this case, an external balance weight is necessary, and further, if an operator does not have the skill of placing and removing the balance weight, performance of the balance cannot be correctly measured. In particular, in the case of an analytical balance with high sensitivity, precautions for measurement must be observed such as paying attention to the movement of the surrounding air when placing a weight, opening and closing a windshield in a short time, and not inserting a hand into the windshield to prevent the generation of a convection flow. If the surrounding environment or the measuring manner is improper, when the results of repetition performance measurement are poor, it cannot be known whether the poor results were caused by an improper surrounding environment or measuring manner or whether a failure to bring about performance of the balance was truly not realized, and finally it becomes impossible to accomplish the purpose of performing accurate weighing.

Among recent balances, there are known balances that have a built-in balance weight in an internal mechanism of the balance, and solves the above-described problem by automatically placing and removing the built-in balance weight, and accordingly enables performance confirmation (for example, Patent Literature 1 and Patent Literature 2).

CITATION LIST

Patent Literatures

Patent Literature 1: Japanese Published Unexamined Patent Application No. 2001-13001
Patent Literature 2: Japanese Published Unexamined Patent Application No. 2012-154878 (paragraphs 0033, 0035, etc.)

SUMMARY OF THE INVENTION

Technical Problem

It is true that by using a built-in balance weight, repetition performance of the balance can be easily checked. However, to realize this, not only a drive section for placing and removing the balance weight but also the balance weight must be built-in, and this increases the cost.

Further, the built-in balance weight is also used for calibration, so that a balance weight with a mass close to a weighing capacity is installed in many cases. However, in actuality, a user wants to weigh a smaller change in many cases, and for performance confirmation with a small weight, the normal built-in balance weight is too heavy, and this does not match the actual conditions.

When using a built-in balance weight, movement of air around the drive system including the balance weight influences a measurement value to no small extent, and for a balance with high sensitivity, a mechanism with a minimized drive system is desirable.

For a line-installed balance, a compact size of the balance itself is required, so that if a built-in balance weight is installed therein, the balance inevitably increases in size, and the built-in balance weight may have to be eliminated and performance confirmation may be performed only with an external balance weight.

The present invention was made in view of the problem in the conventional technology, and an object thereof is to provide an electronic balance that can place and remove a weight by its own mechanism without use of either an external balance weight or a built-in balance weight.

Solution to Problem

In order to attain the above-described object, an electronic balance of electromagnetic force type of an aspect of the present invention includes a Roberval mechanism that guides weight transmission from a weighing pan; a beam that rocks while being guided by the Roberval mechanism; a beam position detecting unit that detects a position of the beam; and a beam equilibrium setting unit that sets the beam position detecting unit in two or more equilibrium states.

Alternatively, an electronic balance of electromagnetic force type of an aspect includes: a Roberval mechanism that guides weight transmission from a weighing pan; a beam that rocks while being guided by the Roberval mechanism; a beam position detecting unit that comprises a window punched at a tip end of the beam, a light emitting element disposed on one side via the window, and light receiving elements, having photovoltaic effect, disposed on the other side via the window and disposed in upper and lower sides of the window; and a beam equilibrium setting unit that sets the beam position detecting unit in two or more equilibrium states by changing a conversion coefficient of one current/voltage converter of one photovoltaic current emitted from one of the upper and lower sides of the light receiving elements into a value that is different from a conversion coefficient of the other current/voltage converter.

In a description based on the above-described aspect, immediately after the conversion coefficient of the current/voltage converter (hereinafter, referred to as I/V converter) is changed, the existing equilibrium ratios of 1:1 of the upper and lower light receiving circuits of the beam position detecting unit are changed, and voltages after conversion become uneven. Therefore, the beam moves to eliminate this voltage difference, and eventually the beam is balanced at a position inclined from the horizontal. In response to this displacement of the beam position, a zero-point load to be measured also changes. This is the same as if a weight is placed on the weighing pan (or a weight is removed from the weighing pan) as viewed from the perspective of the electronic balance.

That is, by utilizing the operating principle of the electronic balance of electromagnetic force type, by intentionally electrically displacing an equilibrium position of the beam in the beam position detecting unit by a beam equilibrium setting unit capable of changing a conversion coefficient of one I/V converter for one photovoltaic current emitted from one of the upper and lower light receiving elements of the beam position detecting unit into a value different from a conversion coefficient of the other I/V converter, a weight (imaginary weight) can be virtually generated without actually placing a balance weight.

Preferably, the above-described electronic balance of electromagnetic force type further includes a performance confirmation means that checks repetition performance of the balance by changing the beam position detecting unit alternately between two states among the two or more equilibrium states.

Preferably, the above-described electronic balance of electromagnetic force type further includes a calibrating means that calibrates the balance by use of measurement values of two states among the two or more equilibrium states.

In the above-described electronic balance of electromagnetic force type, placement and removal of an imaginary weight, that is, changing of a conversion coefficient by a beam equilibrium setting unit can be performed by, in detail, ON/OFF of connection of another resistor by a resistance loading means. That is, by electrically repeating loading of another resistor and canceling thereof, an imaginary weight can be placed and removed, so that the repetition performance of the balance can be easily checked. Also, this imaginary weight can be used as a balance weight for calibration.

Advantageous Effects of Invention

The electronic balance of the present invention can automatically place and remove a weight by using its own mechanism without use of either an external balance weight or a built-in balance weight.

DESCRIPTION OF EMBODIMENTS

Preferred embodiments of the present invention are described with reference to the drawings.

First, the basic form and operating principle of an electronic balance 1 of electromagnetic force type which is a base of the present invention are described with reference to FIG. 1. FIG. 1 is a device configuration diagram of an electronic balance of electromagnetic force type.

An electronic balance 1 of electromagnetic force type includes a Roberval mechanism 2, and the Roberval mechanism 2 includes a columnar floating frame 21 that is subjected to a weight, a fixed portion 22 to be fixed to a case, etc., of the balance, and an upper sub-rod 23 and a lower sub-rod 24 that join the floating frame 21 and the fixed portion 22 via hinge elements 25. A weighing pan 6 is supported by an upper surface of the floating frame 21. A weight received by the weighing pan 6 is guided to the Roberval mechanism 2 and transmitted to a beam 28 joined to the floating frame 21 by two suspension bands 26 and 27.

In the fixed portion 22, an electromagnetic unit 30 is installed. The electromagnetic unit 30 includes a permanent magnet 31 including a yoke and a magnet disposed inside the yoke, and a drive coil 32 disposed around the magnet. The drive coil 32 is fixed to the beam 28.

On the beam 28, a beam position detecting unit 40 is disposed. FIG. 2 is a configuration block diagram of a conventional electronic balance of electromagnetic force type, and describes details of the beam position detecting unit 40. The beam position detecting unit 40 includes a window 41, an LED 42, and photodiodes (light receiving elements) 43 and 44. The window 41 is punched at a tip end of the beam 28. On one side via the window 41, the LED (light emitting element) 42 is disposed. On the other side, the photodiodes 43 and 44 are disposed vertically.

FIG. 3 is a drawing showing states of the beam position detecting unit. Light from the LED 42 passes through the window 41 and is received by the upper and lower photodiodes 43 and 44 according to vertical movement of the beam 28. When no weight is placed on the weighing pan 6, that is, in the case of no load, the beam 28 is balanced at a reference equilibrium position (horizontal position, however, a substantially horizontal state not limited to being strictly horizontal), and a projected image 41a of the window 41 is evenly projected on the upper and lower photodiodes 43 and 44, so that amounts of light received by the upper and lower photodiodes 43 and 44 are equal to each other (the state (a) in FIG. 3). On the other hand, when a weight is loaded on the weighing pan 6, the beam 28 turns and the position of the window 41 at the tip end of the beam 28 moves upward (the state (b) in FIG. 3). At this time, light reaching the upper photodiode 43 is larger than that reaching the lower photodiode 44. The upper and lower photodiodes 43 and 44 convert the received lights into currents (hereinafter, the current of the upper photodiode is referred to as Ia and the current of the lower photodiode is referred to as Ib) and output these. To the upper photodiode 43, an upper I/V converter 47a is connected, and the current Ia is converted into a voltage Va. To the lower photodiode 44, a lower I/V converter 47b is connected, and the current Ib is converted into a voltage Vb. A conversion coefficient Ka of the upper I/V converter 47a and a conversion coefficient Kb of the lower I/V converter 47b are fixed, and designed to be equivalent to each other. As the upper I/V converter 47a and the lower I/V converter 47b, operational amplifiers are generally used.

To the upper I/V converter 47a and the lower I/V converter 47b, a differential amplifier 51 that outputs a difference between the above-described voltages Va and Vb, a PID control unit 52, and a coil drive unit 53 including a drive amplifier, are connected, and function to eliminate unevenness between the voltages Va and Vb. That is, to return the beam that has moved from the above-described reference equilibrium position, a current to be flowed into the drive coil 32 is increased or decreased until the difference Vc between the voltages Va and Vb output from the upper and lower photodiodes 43 and 44 reaches Vc=0, and feedback control is performed until the beam 28 reaches the reference equilibrium position again, that is, until the beam position detecting unit is judged as equilibrium again. Finally, a current corresponding to the weight flows in the drive coil 32. Even in a state where no weight is loaded on the weighing pan 6 and only the weighing pan 6 is present, the Roberval mechanism 2 including the weighing pan 6 is loaded as a zero-point load, so that a current corresponding to this flows.

On the other hand, to the drive coil 32, a weight current I/V converter 61, and an A/D converter 62, and an MPU (microprocessor) 63 are connected, and a weight current flowing through the drive coil 32 is converted into a voltage by the weight current I/V converter 61, and the voltage is quantified by the A/D converter 62 and converted into a weight measurement value by the MPU 63. The MPU 63 includes a CPU, a ROM, and a RAM not shown in the figure, and various control programs are recorded in the ROM and are executed. To the MPU 63, an operation key 64 and a display unit 65, etc., are connected, and various operations and various results can be confirmed.

The basic form and operating principle of the electronic balance of electromagnetic force type are described above. In association with this, a configuration of the present embodiment is described hereinafter. The same components as conventional configurations are designated by the same reference signs, and description thereof is omitted.

FIG. 4 is a configuration block diagram of an electronic balance of electromagnetic force type according to the embodiment of the present invention, and FIG. 5 is an essential portion circuit diagram of FIG. 4. The present embodiment is different from a conventional configurations in that the conversion coefficient KA of the upper I/V converter 47A connected to the upper photodiode 43 is configured to be variable. The MPU 63 is provided with an equilibrium ratio determining unit 72. The upper I/V converter 47A and the equilibrium ratio determining unit 72 serve as a beam equilibrium setting unit.

The lower I/V converter 47b to be connected to the lower photodiode 44 is the same as the conventional lower I/V converter 47b shown in FIG. 2, and its conversion coefficient Kb is fixed. FIG. 5 describes an example of a configuration thereof. The lower I/V converter 47b includes an operational amplifier 45b and a resistor 46b. A resistance value of the resistor 46b is set to 100 kΩ by way of example. That is, in this case, the conversion coefficient kb is 100 kΩ (fixed).

On the other hand, in the upper I/V converter 47A, as shown in FIG. 5, to the operational amplifier 45a, an existing resistor 46a and a first resistor 73a1, a second resistor 73a2, a third resistor 73a3, and a fourth resistor 73a4 are connected in parallel. To the existing resistor 46a and these other resistors 73a1 to 73a4, analog switches 71 are connected so as to be respectively paired with the resistors. The existing resistor 46a and other resistors 73a1 to 73a4 have resistance values different from each other, and by way of example, the existing resistor 46a is set to 100 kΩ equivalent to the lower resistor 46b, the first resistor 73a1 is set to 91 kΩ, the second resistor 73a2 is set to 85 kΩ, the third resistor 73a3 is set to 39 kΩ, and the fourth resistor 73a4 is set to 8 kΩ. That is, in this case, the conversion coefficient KA is any of 100 kΩ, 91 kΩ, 85 kΩ, 39 kΩ, and 8 kΩ, and variable.

Any one of the existing resistor 46a and other resistors 73a1 to 73a4 of the upper I/V converter 47A is loaded in response to conversion ratio selection signals (0) to (4) from the equilibrium ratio determining unit 72. The existing resistor 46a is loaded in response to the selection signal (0), the first resistor 73a1 is loaded in response to the selection signal (1), the second resistor 73a2 is loaded in response to the selection signal (2), the third resistor 73a3 is loaded in response to the selection signal (3), and the fourth resistor 73a4 is loaded in response to the selection signal (4).

To perform a normal work to weigh a weighing object, the equilibrium ratio determining unit 72 uses the existing resistor 46a in response to the selection signal (0) so that the ratios of the upper and lower light receiving circuits become equivalent to each other. Accordingly, as is conventionally done, equilibrium is established in a state where the beam 28 is horizontal (first equilibrium state).

On the other hand, in a case where a balance performance confirmation method or a balance calibration method described later is performed, the equilibrium ratio determining unit 72 selects any of the selection signals (1) to (4) according to an imaginary weight desired to be generated to change the conversion ratios of the upper and lower light receiving circuits.

Here, an operation of the electronic balance 1 according to the present embodiment in a case where the selection signal (2) is output by the equilibrium ratio determining unit 72 is described. To the upper and lower photodiodes 43 and 44, a rated current of, for example, 100 μA is supplied from a rated current source 75, and immediately after the selection signal (2) is output, no load is on the weighing pan 6, so that the beam 28 is horizontal, and the currents Ia and Ib from the upper and lower photodiodes 43 and 44 are equivalent to each other (50 μA). However, due to the selection signal (2), in the upper light receiving circuit, the second resistor 73a2 (85 kΩ) is loaded onto the current Ia, so that the voltage Va becomes smaller (−4.25 V) than in the case using the existing resistor 46a (−5.0 V) and causes an imbalance with the voltage Vb (−5.0 V) of the lower light receiving circuit. Therefore, the balance functions so that the voltage Va=the voltage Vb, and the beam 28 moves upward. Eventually, in a state where the beam 28 inclines upward, the current Ia of the upper light receiving circuit converges to 54 μA, the current Ib of the lower light receiving circuit converges to 46 μA, and the voltages converge to Va=Vb=substantially −4.6 V (second equilibrium state). According to the change of the equilibrium position of the Roberval mechanism 2, the weighing pan 6 is displaced in the direction to be pushed, so that the zero-point load becomes larger than before. In response to this, a current value to be obtained from the drive coil 32 changes, and a zero-point load larger than the zero-point load measured when the beam 28 is in a horizontal state is measured. This is the same as if a weight is placed on the weighing pan 6 as viewed from the perspective of the electronic balance 1.

Thus, in the electronic balance 1 according to the present embodiment, the I/V conversion coefficients KA and Kb of photocurrents output from the upper and lower photodiodes 43 and 44 are made nonequivalent to each other, and the equilibrium ratios of the upper and lower photodiodes are changed to displace the equilibrium position of the beam 28 to be detected by the beam position detecting unit 40 from the initial reference equilibrium position (first equilibrium state) to another position (second to fifth equilibrium states), and accordingly, an imaginary weight corresponding to each equilibrium state can be generated. That is, without actually placing a balance weight, the same state as if a weight is placed on the weighing pan 6 can be created.

Similarly, by the equilibrium ratio determining unit 72, when the selection signal (1) is output, the first resistor 73a1 is loaded onto the current Ia, and the third equilibrium state is created. When the selection signal (3) is output, the third resistor 73a3 is loaded onto the current Ia, and the fourth equilibrium state is created. When the selection signal (4) is output, the fourth resistor 73a4 is loaded onto the current Ia, and the fifth equilibrium state is created. As the difference between equilibrium ratios of upper and lower circuits is increased, a larger imaginary weight can be generated.

Next, placement and removal of this imaginary weight can be performed by turning ON/OFF the selection signal of the equilibrium ratio determining unit 72. That is, electrically, by repeating loading of other resistors 73a1 to 73a4 and canceling thereof, repetition performance of the balance can be checked through placement and removal of the imaginary weight. This is described hereinafter.

FIG. 6 is a flowchart of a balance performance confirmation method using the electronic balance according to the present invention. First, in Step S1, from the operation key 64, a reference value A0 of the equilibrium ratios of the upper and lower light receiving circuits, a change value An by which a change to a target equilibrium ratio is made, and the number of repetitions N are set. This setting is performed from the operation key 64, etc. The reference value A0 is basically A0=0.5/0.5=1.0 on the basis of ratios of light receiving circuits, that is, a ratio of the upper circuit to the lower circuit=50% (KA=100 kΩ):50% (Kb=100 kΩ). However, to increase own zero-point load, the reference value as a basis may be set to be higher (for example, A0=1.2). The change value An is, in the example described above, An=0.46/0.54=0.85 in the case of the ratio of the upper circuit to the lower circuit=46% (KA=85 kΩ):54% (Kb=100 kΩ). Next, in step S2, the reference value A0 is specified in the circuits. In the example described above, the equilibrium ratio determining unit 72 outputs the selection signal (0). Next, in Step S3, a measurement value W0 in the case of the reference value A0 is read. Then, in Step S4, the change value An is specified in the circuits. In the example described above, the equilibrium ratio determining unit 72 outputs the selection signal (2). Next, in Step S5, a measurement value Wn in the case of the change value An is read. Next, in Step S6, a span Sn of the measurement values is calculated. The span Sn=Wn−W0, and for example, when the measurement value W0=20.0000 g and the measurement value W1=23.3000 g, Sn=3.3000 g. Next, in Step S7, whether the number of repetitions N set in Step S1 has been reached is judged. When the number of repetitions N is not reached, the process returns to Step S2. When the number of repetitions N is reached, a standard deviation σ is calculated from a measurement value span Sn of N measurements, and the process is ended. The above-described arithmetic operation is performed by the MPU 63. The MPU 63 serves as a performance confirmation means.

That is, the electronic balance 1 includes the performance confirming means that checks repetition performance of the balance from a measurement value measured at the reference equilibrium position and a measurement value measured at the other equilibrium position by alternately changing the beam position detecting unit between two states where the equilibrium position is set to the reference equilibrium position and the equilibrium position is set to another equilibrium position corresponding to an imaginary weight desired to be placed, among two or more equilibrium states that can be set by the beam equilibrium setting unit (upper I/V converter 47A).

FIG. 7 shows results of measurement by the performance confirmation method shown in FIG. 6, and shows, by way of example, an imaginary weight value and repetition performance (standard deviation) σ when the ratios of the upper and lower light receiving units are changed in a balance with a weighing capacity of 200 g. The case where the standard deviation is 0.1 mg or less is evaluated as excellent (double circle), the case where the standard deviation is more than 0.1 mg and not more than 10 mg is evaluated as good (circle), and the case where the standard deviation is over 10 mg is evaluated as not good (triangle).

In a "standard state," in response to the selection signal (0), the resistor 46b is applied to the lower circuit, and the existing resistor 46a is applied to the upper circuit, and ratios of the light receiving circuits, that is, a ratio of the upper light receiving circuit to the lower light receiving circuit=50% (KA=100 kΩ):50% (Kb=100 kΩ), and the change value An=1.0. In a "state A," in response to the selection signal (1), the resistor 46b was applied to the lower circuit, and the first resistor 73a1 was applied to the upper circuit, and ratios of the light receiving circuits, that is, a ratio of the upper light receiving circuit to the lower light receiving circuit=48% (KA=91 kΩ):52% (Kb=100 kΩ), and the change value An=0.92, and as a result, an imaginary weight was 1.7 g, and the repetition performance σ was excellent (double circle). A "state B" is an example described in detail above in which, in response to the selection signal (2), the resistor 46b was applied to the lower circuit, the second resistor 73a2 was applied to the upper circuit, and ratios of the light receiving circuits, that is, a ratio of the upper light receiving circuit to the lower light receiving circuit=46% (KA=85 kΩ):54% (Kb=100 kΩ), and the change value An=0.85, and as a result, an imaginary weight was 3.3 g, and the repetition performance σ was excellent (double circle). In a "state C," in response to the selection signal (3), the resistor 46b was applied to the lower circuit, the third resistor 73a3 was applied to the upper circuit, and ratios of the light receiving circuits, that is, a ratio of the upper light receiving circuit to the lower light receiving circuit=29% (KA=39 kΩ):71% (Kb=100 kΩ), and the change value An=0.41, and as a result, an imaginary weight was 19 g, and the repetition performance σ was good (circle). In a "state D," in response to the selection signal (4), the resistor 46b was applied to the lower circuit, the fourth resistor 73a4 was applied to the upper circuit, and ratios of the light receiving circuits, that is, a ratio of the upper light receiving circuit to the lower light receiving circuit=7% (KA=8 kΩ):93% (Kb=100 kΩ), and the change value An=0.08, and as a result, an imaginary weight was 63 g, and the repetition performance σ was not good (triangle).

From these results, it was found that excellent repetition performance was obtained with a small amount of imaginary weight as in the "state A" and "state B." From this fact, the present invention could be confirmed as very effective for performance check with a small weight. In the case of the imaginary weight in the "state C" or "state D," it is considered that the inclination of the beam 28 increased, an output signal of the photodiode the light receiving amount of which was decreased was buried in noise, and the S/N ratio was deteriorated. However, the imaginary weight in the "state C" or "state D" can be handled by increasing the light receiving amount by shaping, etc., the window 41 that currently has a precise circle shape into a vertically long oval shape, or selecting photodiodes having appropriate shapes, and therefore, the present invention is still sufficiently effectively usable.

Next, the electronic balance 1 according to the present invention can generate an imaginary weight by utilizing its own mechanism, so that the imaginary weight can be used as a balance weight for calibration. This is described hereinafter. FIG. 8 is a flowchart of a balance calibration method using the electronic balance according to the present invention.

First, in Step S11, from the operation key 64, a reference value A0 of the equilibrium ratios of the upper and lower light receiving circuits, and a calibration value Aa by which calibration to a target equilibrium ratio can be made is set. This setting is performed from the operation key 64, etc. The reference value A0 is basically A0=1.0. However, to increase its own zero-point load, the reference value as a basis may be set to be higher (for example, A0=1.2). As the calibration value An, An=0.85 (upper circuit to lower circuit=46% (KA=85 kΩ):54% (Kb=100 kΩ), used in the example described above, is used for explanation. Next, in Step S12, the reference value A0 is specified in the circuits, and a measurement value W0 (for example, W0=20.0000 g) is read. Next, in step S13, a calibration value Aa is specified in the circuits, and a measurement value Wa (for example, Wa=23.3000 g) is read. Next, in Step S14, calibration data Wc=Wa−W0 is calculated (for example, Wc=23.3000 g−20.000 g=3.3000 g). Next, in Step S15, a correction coefficient k is set to 1. Next, in Step S16, the equilibrium ratio determining unit 72 restores the equilibrium ratios of the circuits to the reference value A0. Next, in Step S17, weighing data Wn (before correction) is acquired. For example, Wn=2.0000 g is acquired. Next, in Step S18, the weighing data Wn is corrected by the correction coefficient k, and corrected data Wn' is displayed on the display unit 65. For example, Wn (2.0000 g)×k (1.0000)=2.0000 g, and corrected data Wn'=2.0000 g is obtained. Thus, corrected weighing data is normally displayed on the display of the balance. Next, in Step S19, from the operation key 64, whether a calibration key has been pressed is judged. When it is not pressed, the process returns to Step S17. When it is pressed, the process shifts to Step S20. When the process advances to Step S20, the reference value A0 is set in the circuits, and a measurement value W0' (for example, W0'=20.0000 g) is read. Next, in Step S21, the calibration value Aa is set in the circuits, and a measurement value Wa' (for example, Wa'=23.3010 g) is read. Next, in Step S22, deviation data Wc'=Wa'−W0' is calculated (for example, Wc'=Wa'−W0'=23.3010 g−20.0000 g=3.3010 g). Next, in Step S23, the correction coefficient k=Wc'/Wc is calculated and stored (for example, k=3.3010/3.3000=1.0003).

Next, in Step S24, the equilibrium ratios in the circuits are restored to the reference value A0, and the process returns to Step S17. Thereafter, after weighing data is acquired by setting k=1.0003 in Steps S17 and S18, this weighing data is corrected. The arithmetic operation described above is performed in the MPU 63. The MPU 63 serves as a calibrating means.

That is, the electronic balance 1 includes a calibrating means that changes the beam position detecting unit into two states where the equilibrium position is set to a reference equilibrium position and the equilibrium position is set to another equilibrium position corresponding to an imaginary weight desired to be used as a balance weight for calibration, obtains calibration data from a measurement value measured in advance at the reference equilibrium position and a measurement value measured at the other equilibrium position, obtains deviation data from a measurement value measured at the reference equilibrium position and a measurement value measured at the other equilibrium position at the time of calibration, and calibrates the balance by correcting weighing data by a correction coefficient obtained by dividing the deviation data by the calibration data.

Even if the calibration key is not pressed in Step S19, when the span value is automatically periodically inspected and a deviation of a measurement value (defective span value) is found, an alarm or the like may be generated. When there is a change in ambient temperature, the span value may be automatically confirmed and the correction coefficient may be updated.

Next, FIG. 9 is a modification of the embodiment of the present invention. In FIG. 9, the upper and lower circuits in FIG. 5 are reversed, and the conversion coefficient KB of the lower I/V converter 47B in the lower light receiving circuit is variable, and the conversion coefficient ka of the upper I/V converter 47a in the upper light receiving circuit is fixed. To the upper I/V converter 47a, only the resistor 46a (100 kΩ) is loaded. To the lower I/V converter 47B, similar to the upper I/V converter 47A in FIG. 5, the existing resistor 46b (100 kΩ), the first resistor 73a1, the second resistor 73a2, the third resistor 73a3, and the fourth resistor 73a4 are selectively connected in parallel. In this modification, the lower I/V converter 47B and the equilibrium ratio determining unit 72 serve as a beam equilibrium setting unit.

In this modification, when the selection signal (2) is output as in the example described above, ratios of the upper and lower light receiving circuits become inverse of those in the example described above, and the beam 28 moves downward, and eventually, in a state where the beam 28 inclines downward, the current Ia of the upper light receiving circuit converges to 46 µA, the current Ib of the lower light receiving circuit converges to 54 µA, and the voltages converge to Va=Vb=substantially −4.6 V. That is, a ratio of the upper circuit to the lower circuit=46%:54%, the beam 28 moves downward, and the measurement value Wn in FIG. 6 and FIG. 7 is obtained as a negative weight.

Even if the measurement value Wn is a negative value, it can be handled similar to a positive weight, so that the repetition performance can be checked in the same manner as shown in FIG. 6. Even if the measurement value Wn is a negative value, by using an absolute value, the balance can be calibrated in the same manner as shown in FIG. 8.

The configuration shown in FIG. 9 is effectively applied to an electronic balance of electromagnetic force type called a secondary lever (a structure with two beams to which two levers are joined). In the secondary lever type electronic balance, to increase the sensitivity with a small current, a mechanism that transmits a weight by the first beam and the second beam is adopted. An equilibrium position detecting unit is provided at a tip end of the second beam in the same manner as in the embodiment described above, and when a weight is placed on the weighing pan, the first beam inclines upward, and the second beam 282 inclines downward. The configuration shown in FIG. 9 is preferably applied to such a type of electronic balance that performs weighing by adjusting the equilibrium of the second beam that inclines downward.

Next, in the embodiment described above, the present invention is carried out with an electronic balance of electromagnetic force type including an optical type beam position detecting unit, however, the present invention can also be applied to an electronic balance of electromagnetic force type including a capacitance beam position detecting unit. This embodiment is different from the above-described embodiment (FIG. 4) only in the configuration of the beam position detecting unit 40, and other configurations are the same as in the above-described embodiment.

FIG. 10 is a configuration block diagram of an electronic balance of electromagnetic force type according to another embodiment of the present invention, describing details of the capacitance beam position detecting unit 40. The same components as in the embodiment described above are designated by the same reference signs, and description thereof is omitted.

To a tip end of the beam 28, a movable electrode 48 whose position moves vertically in conjunction with the beam 28 is fixed. At upper and lower sides of the movable electrode 48, immovable electrodes 49a and 49b whose positions are immovable are disposed. These movable electrode 48 and immovable electrodes 49a and 49b serve as a beam position detecting unit 40 of the present embodiment.

In this case, a capacitance between the immovable electrode 49a and the movable electrode 48 is Ca, and a capacitance between the immovable electrode 49b and the movable electrode 48 is Cb. To the movable electrode 48 and the immovable electrodes 49a and 49b, a capacitance/voltage converter 47'A that detects the capacitance Ca and a capacitance/voltage converter 47'B that detects the capacitance Cb are connected. Conventionally, equilibrium is established so that the capacitance Ca and the capacitance Cb become equal to each other, however, in the present embodiment, by the equilibrium ratio determining unit 72 of the MPU 63, by making conversion coefficients of the capacitance/voltage converter 47'A and the capacitance/ voltage converter 47'B different from each other, another equilibrium state can be created. That is, without actually placing a balance weight, the same state as if a weight is placed on the weighing pan 6 can be created. In the present embodiment, repetition performance can also be checked in the same manner as in FIG. 6, and the balance can be calibrated in the same manner as in FIG. 8.

In the plurality of embodiments described above, the beam equilibrium setting unit is only required to create two or more equilibrium states of a state where the equilibrium ratios of the upper and lower light receiving circuits are 1:1 and a state(s) where the ratios are different from 1:1. As the conversion coefficients of the upper and lower light receiving circuits, it is acceptable that the I/V conversion coefficient of one light receiving circuit is set to be fixed and the I/V conversion coefficient of the other light receiving circuit is set to be variable, or the I/V conversion coefficients of the upper and lower light receiving circuits are set to be variable and one of the I/V conversion coefficients is set to be different from the other one.

In the above-described embodiments, the beam equilibrium setting unit includes a group of resistors that are selected in response to a selection signal, however, it is also possible that a time ratio of ON/OFF of resistor connection is set by a PWM signal, and an arbitrary resistance value is equivalently variably loaded. Here, as a period of the PWM signal, by selecting a high frequency to which the mechanical portion does not respond, a necessary weight can be selectively freely generated.

If the equilibrium state is changed, a magnitude of a magnetic field around the coil that generates an electromagnetic force may change, and in this case, it is desirable that a proper correction (linear correction or temperature correction) is applied in the new equilibrium state.

The above-described embodiments show examples in which an optical type and a capacitance type are applied as the beam position detecting unit, and in addition to these, non-contact position detection methods such as an eddy current type, an ultrasonic type, and a laser type are also applicable.

As another effect of the electronic balances 1 of the embodiments described above, the electronic balances 1 described above can load a weight by an electric operation of its own mechanism. Therefore, differently from the case of using a built-in balance weight, movement of air around the drive system including the balance weight does not influence a measurement value.

The electronic balance 1 of the present embodiment does not need a built-in balance weight and a drive unit thereof, and therefore, an area occupied by the balance itself can be minimized, and the balance can be applied as a line-installed balance desirable to be downsized.

When assembling a mechanical portion of the electronic balance 1, offset weight adjustment (backlash error adjustment) may be required, and conventionally, a positional change is forcibly made by inserting a spacer in the beam position detecting unit 40, however, in the present embodiment, this operation can be electrically and easily performed by selecting other resistors 73a1 to 73a4.

When the electronic balance 1 includes a mechanism that detects vibration, it can also be considered that the mechanism is applied to cancel influences of the vibration by applying antiphase vibration to the electronic balance 1.

BRIEF DESCRIPTION OF THE DRAWINGS

FIG. 7 shows results of measurement according to the performance confirmation method shown in FIG. 6.

REFERENCE SIGNS LIST

Figure 1:
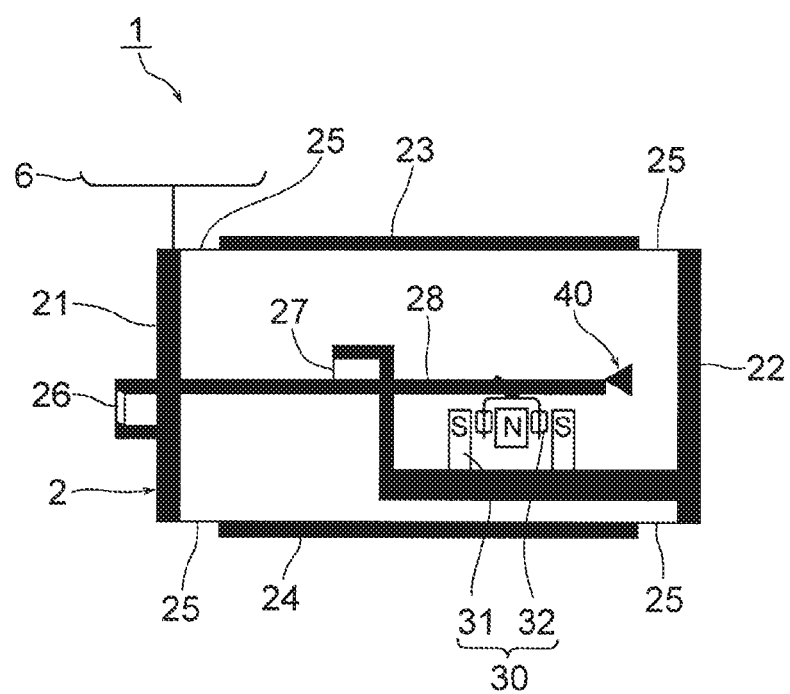
FIG. 1 is a configuration diagram of a conventional electronic balance of electromagnetic force type.
Figure 2:
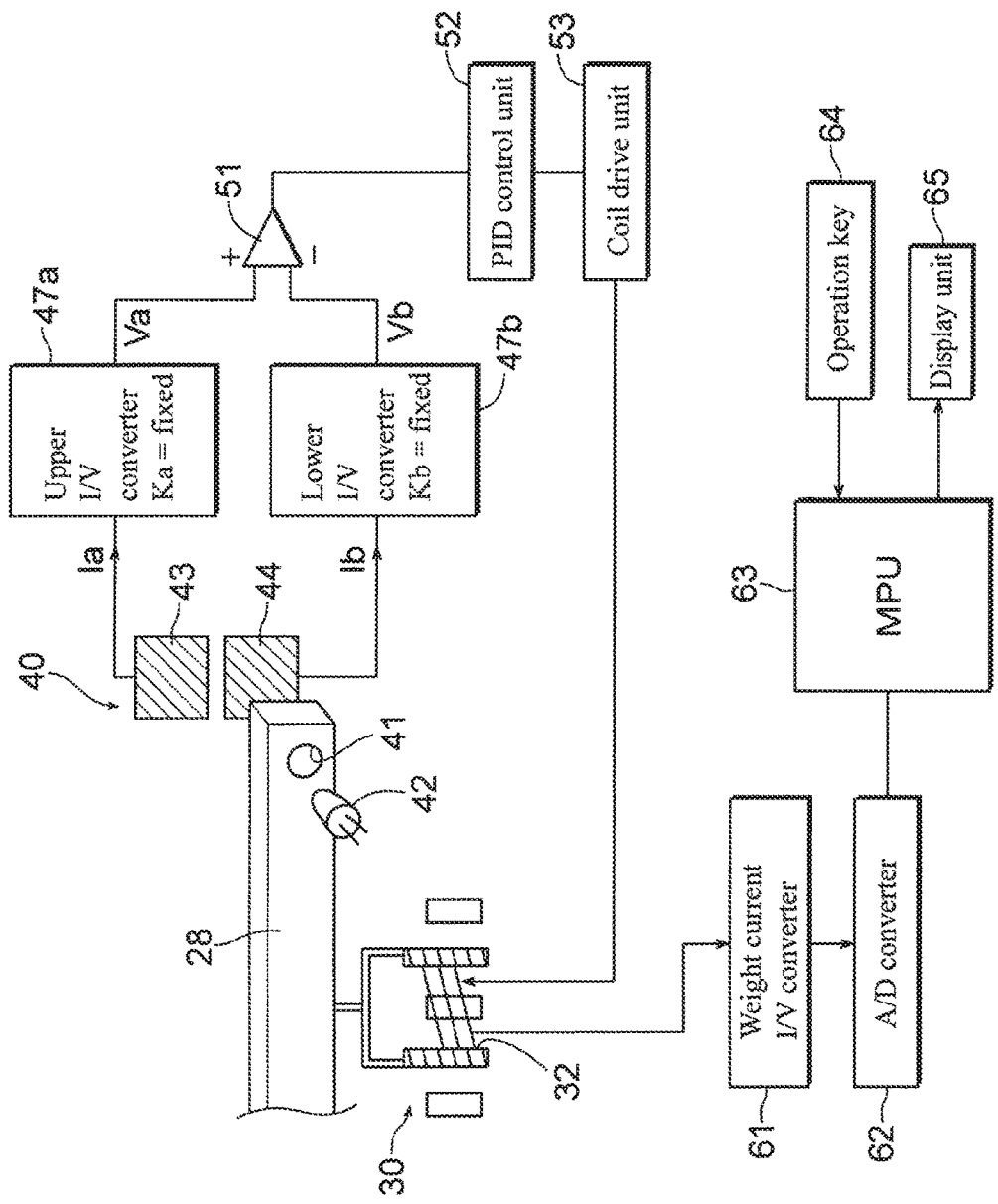
FIG. 2 is a configuration block diagram of the conventional electronic balance of electromagnetic force type.
Figure 3A:
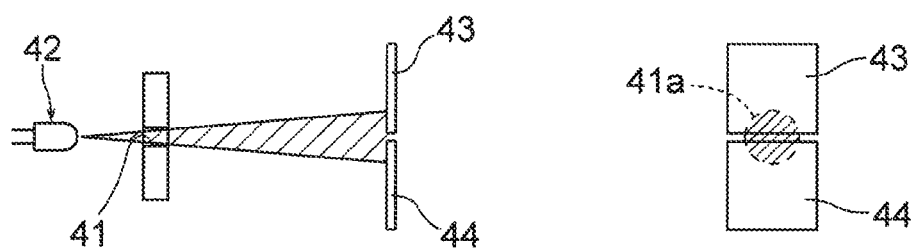
FIGS. 3A and 3B are views describing a state of a beam position detecting unit.
Figure 3B:
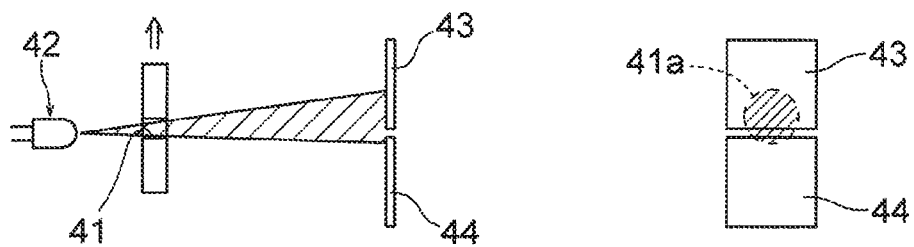
Figure 4:
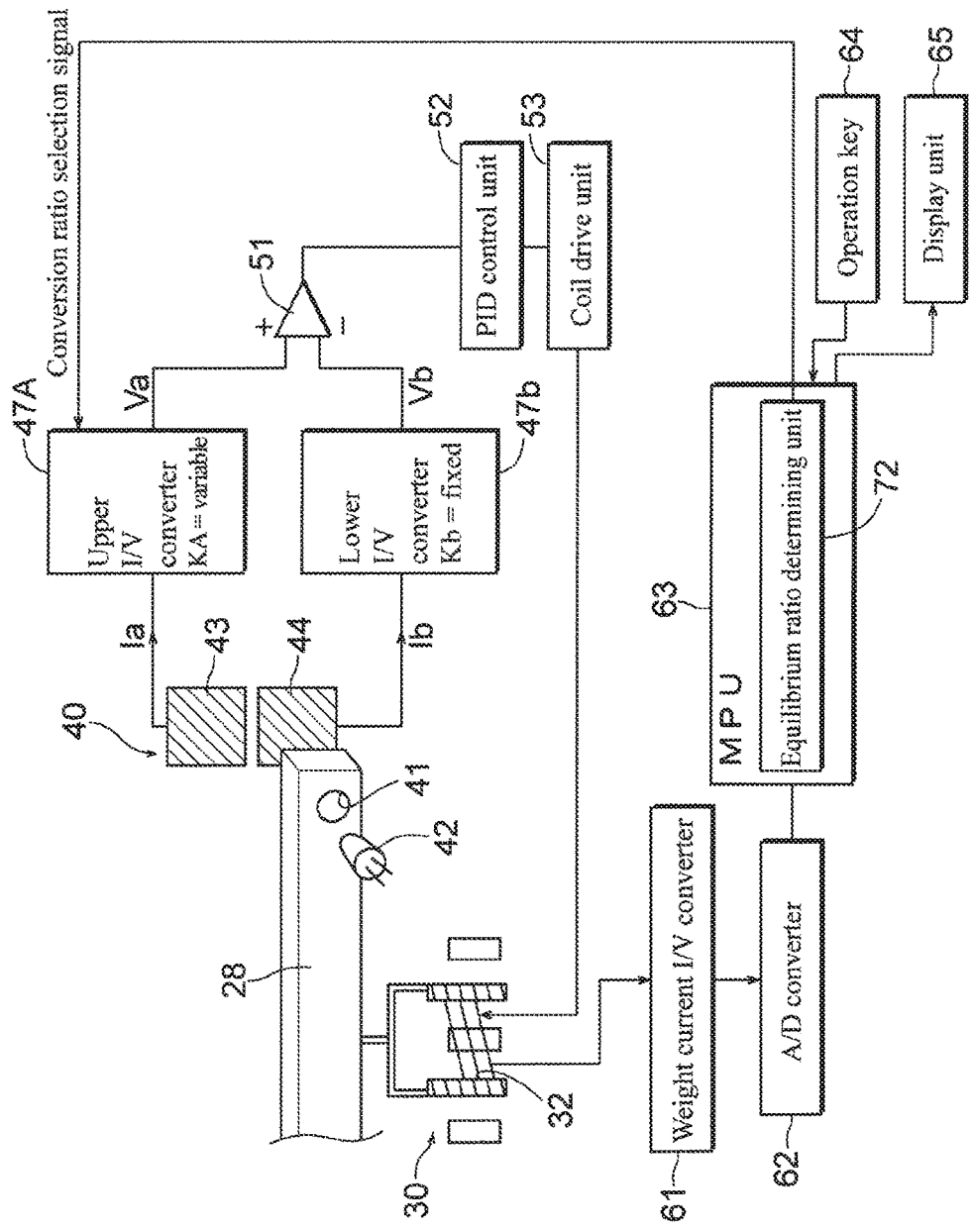
FIG. 4 is a configuration block diagram of an electronic balance of electromagnetic force type according to an embodiment of the present invention.
Figure 5:
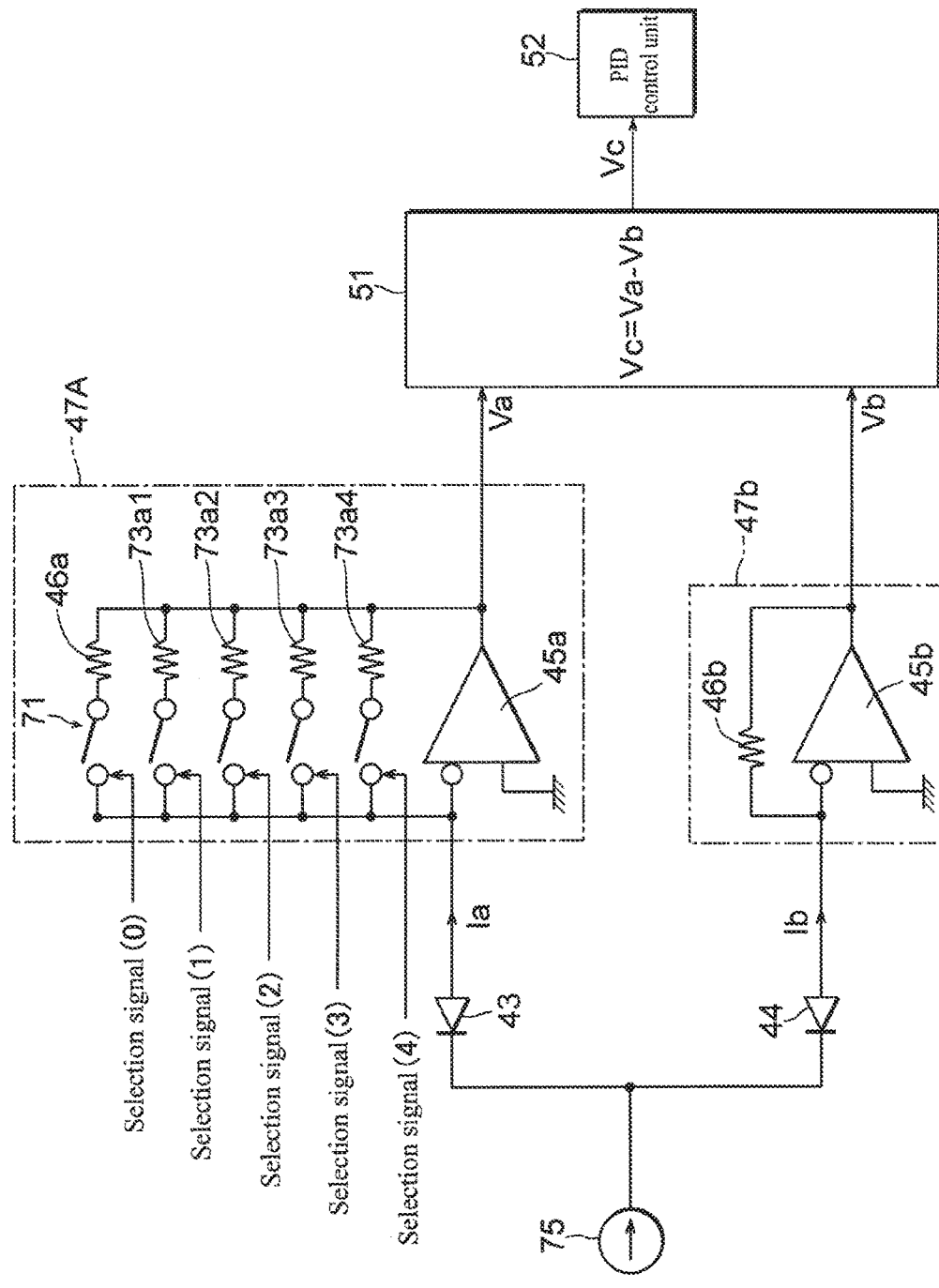
FIG. 5 is an essential portion circuit diagram of FIG. 4.
Figure 6:
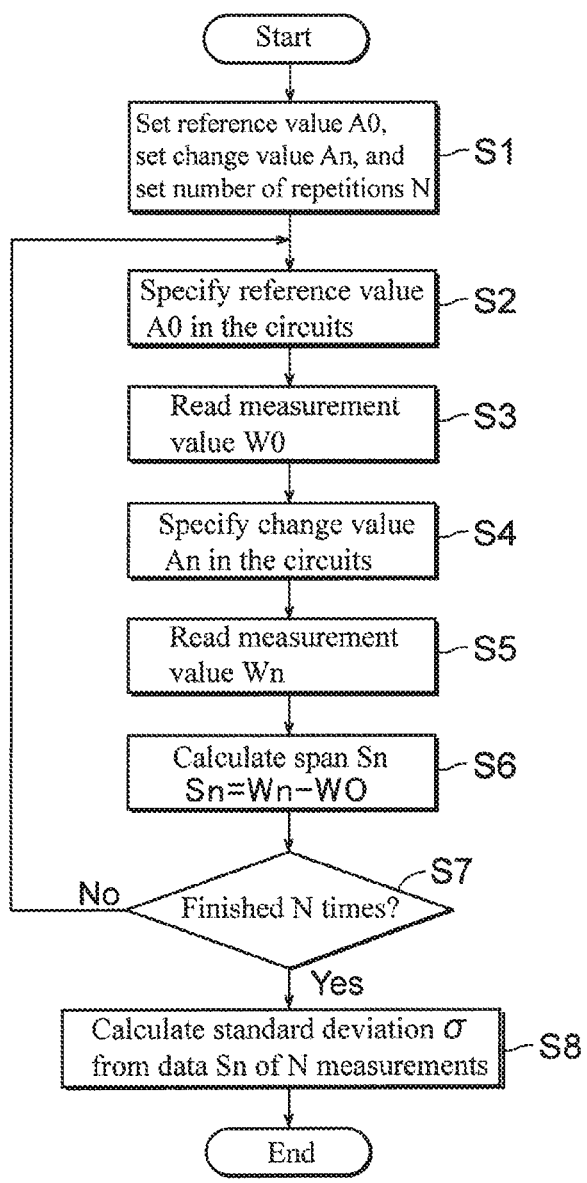
FIG. 6 is a flowchart of a balance performance confirmation method using the electronic balance according to the present invention.
Figure 8:
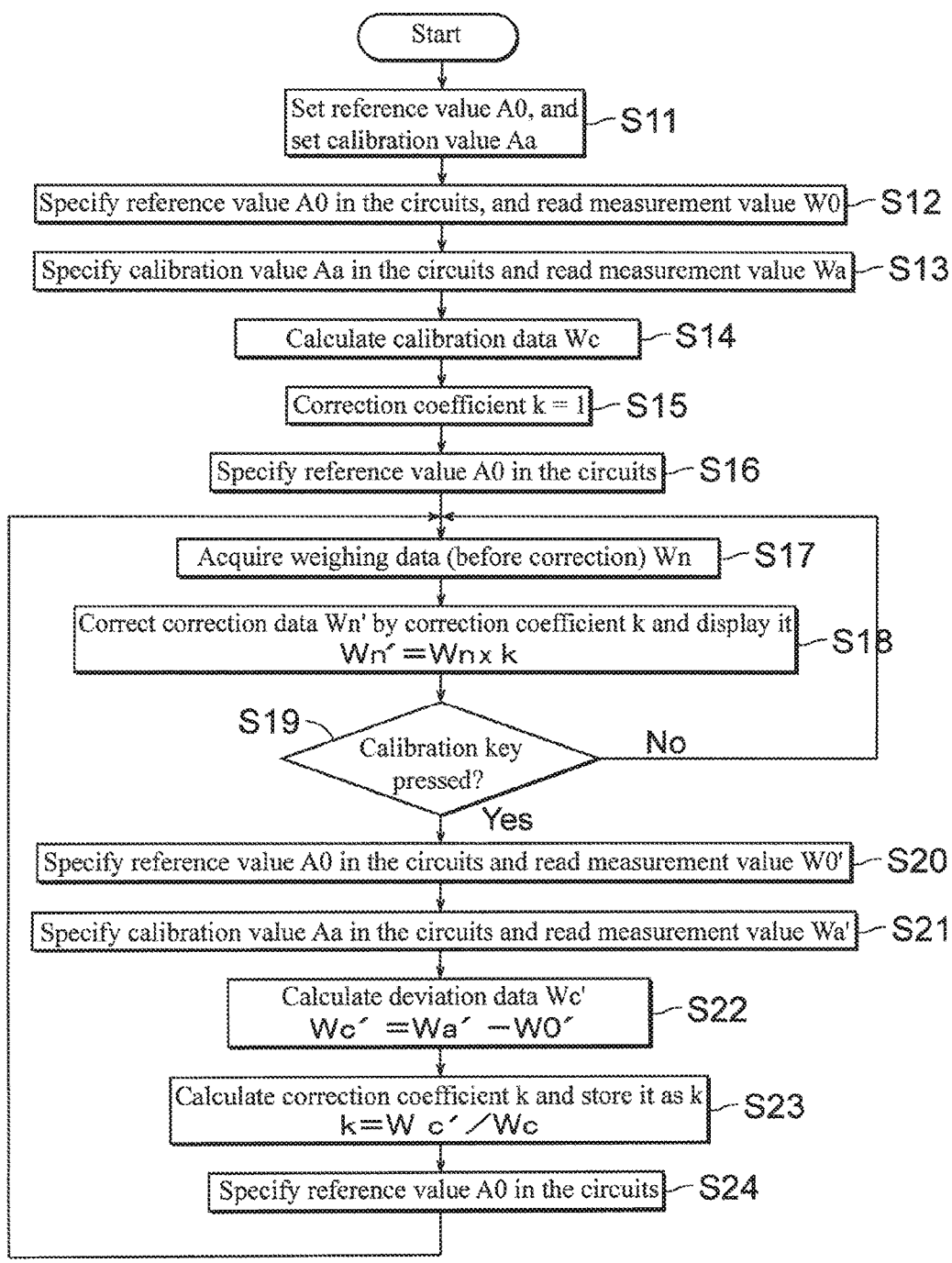
FIG. 8 is a flowchart of a balance calibration method using the electronic balance according to the present invention.
Figure 9:
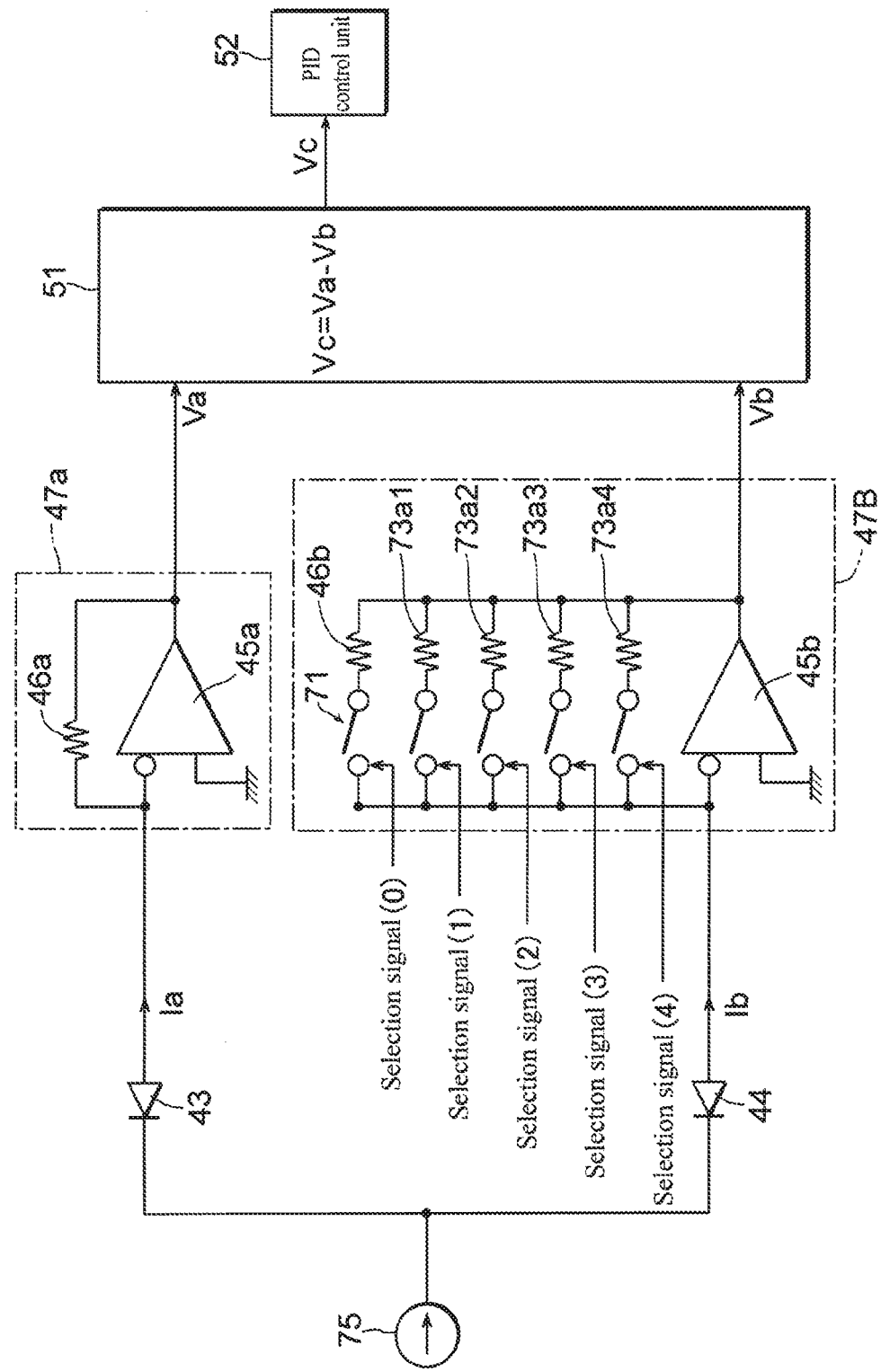
FIG. 9 is a modification of the embodiment of the present invention.
Figure 10:
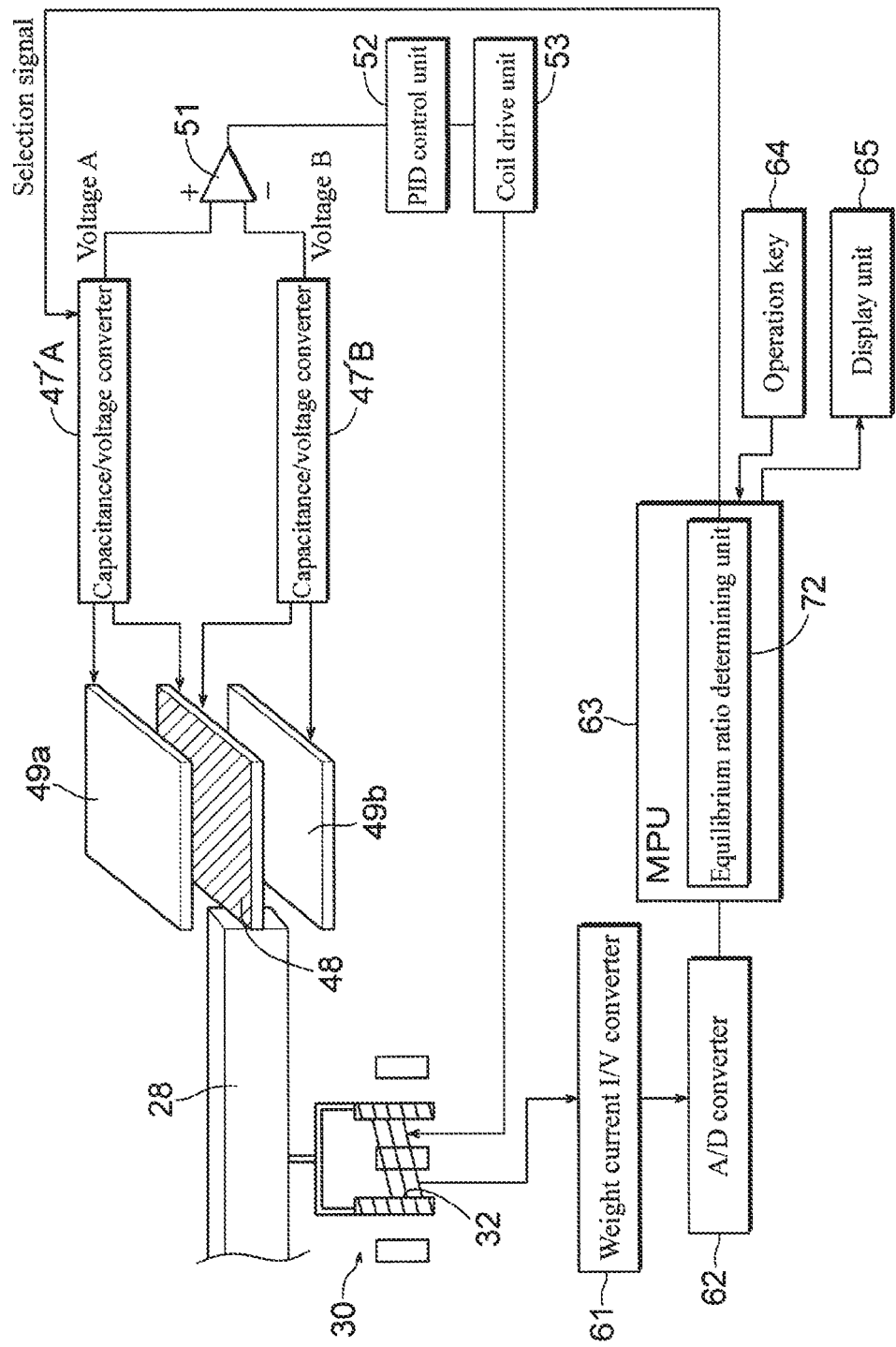
FIG. 10 is a configuration block diagram of an electronic balance of electromagnetic force type according to another embodiment of the present invention.

1 Electronic balance of electromagnetic force type
2 Roberval mechanism
6 Weighing pan
28 Beam
32 Drive coil
40 Beam position detecting unit
41 Window
42 LED
43, 44 Photodiode
47A Upper I/V converter (beam equilibrium setting unit)
47b Lower I/V converter
46a, 73a1-73a4, 46b Resistor
72 Equilibrium ratio determining unit (beam equilibrium setting unit)

The invention claimed is:

1. An electromagnetic force electronic balance, comprising:
  a Roberval mechanism that guides weight transmission from a weighing pan;
  a beam that is swayed while being guided by the Roberval mechanism;
  a beam position detecting unit that comprises a window punched at a tip end of the beam; a light emitting element disposed on one side via the window; and light receiving elements, having photovoltaic effect, disposed on the other side via the window and disposed in upper and lower sides of the window; and
  a beam equilibrium setting unit that sets the beam position detecting unit in two or more equilibrium states by changing a conversion coefficient of one current/voltage converter of one photovoltaic current emitted from one of the upper and lower sides of the light receiving elements into a value that is different from a conversion coefficient of the other current/voltage converter.

2. An electromagnetic force electronic balance, comprising:
  a Roberval mechanism that guides weight transmission from a weighing pan;
  a beam that is swayed while being guided by the Roberval mechanism;
  a beam position detecting unit that comprises a movable electrode, fixed at a tip end of the beam, movable upward and downward in interlock with the beam; and immovable electrodes arranged in upper and lower sides of the movable electrode and each fixed; and a beam equilibrium setting unit that sets the beam position detecting unit in two or more equilibrium states by changing a conversion coefficient of one capacitance/voltage converter for detecting a capacitance between the upper immovable electrode and the movable electrode into a value that is different from a conversion coefficient of the other capacitance/voltage converter for detecting a capacitance between the lower immovable electrode and the movable electrode.

3. The electromagnetic force electronic balance according to claim 1, further comprising the electronic balance further comprises a performance confirming means that checks repetition performance of the balance by changing the beam position detecting unit alternately between two states among the two or more equilibrium states.

4. The electromagnetic force electronic balance according to claim 1, further comprising:

the electronic balance further comprises a calibrating means that calibrates the balance by use of measurement values of two states among the two or more equilibrium states.

5. The electromagnetic force electronic balance according to claim 2, further comprising:

the electronic balance further comprises a performance confirming means that checks repetition performance of the balance by changing the beam position detecting unit alternately between two states among the two or more equilibrium states.

6. The electromagnetic force electronic balance according to claim 2, further comprising:

the electronic balance further comprises a calibrating means that calibrates the balance by use of measurement values of two states among the two or more equilibrium states.

* * * * *